(12) United States Patent
Vallur

(10) Patent No.: US 10,511,998 B1
(45) Date of Patent: Dec. 17, 2019

(54) SYSTEM AND METHOD FOR IDENTIFYING FALSE SHORT MESSAGE SERVICE (SMS) DELIVERY REPORTS

(71) Applicant: Syniverse Technologies, LLC, Tampa, FL (US)

(72) Inventor: Ramakanth Vallur, Bangalore (IN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/550,729

(22) Filed: Aug. 26, 2019

Related U.S. Application Data

(60) Provisional application No. 62/724,383, filed on Aug. 29, 2018.

(51) Int. Cl.
| | | |
|---|---|---|
| *H04W 28/04* | (2009.01) | |
| *H04W 4/20* | (2018.01) | |
| *H04M 3/42* | (2006.01) | |
| *H04W 4/14* | (2009.01) | |

(52) U.S. Cl.
CPC ....... *H04W 28/04* (2013.01); *H04M 3/42382* (2013.01); *H04W 4/20* (2013.01); *H04W 4/14* (2013.01)

(58) Field of Classification Search
CPC ......... H04W 28/04; H04W 4/20; H04W 4/14; H04M 3/42382
See application file for complete search history.

(56) References Cited

U.S. PATENT DOCUMENTS

2011/0130127 A1* 6/2011 Worth ..................... H04L 51/12
455/414.1
2018/0124615 A1* 5/2018 Acosta ................ H04L 41/5009

* cited by examiner

*Primary Examiner* — Marcos L Torres
(74) *Attorney, Agent, or Firm* — Molly L. Sauter; Smith & Hopen, P.A.

(57) ABSTRACT

A system and method of detecting false Short Messaging Service (SMS) delivery reports utilizing machine learning. A statistical model is prepared based on attributes of SMS delivery reports that are known to be genuine. An anomaly detection algorithm compares attributes of the subsequent SMS messages against the statistical model. The anomaly detection algorithm is used to detect, and flag false SMS delivery reports returned by aggregators and operators.

20 Claims, 4 Drawing Sheets

SYSTEM AND METHOD FOR IDENTIFYING FALSE SHORT MESSAGE SERVICE (SMS) DELIVERY REPORTS

CROSS-REFERENCE TO RELATED APPLICATIONS

This application claims priority to U.S. Provisional Patent Application No. 62/724,383, entitled "Method of Identifying False SMS Delivery Reports", filed Aug. 29, 2018 by the same inventors, the entirety of which is incorporated herein by reference.

BACKGROUND OF THE INVENTION

This invention relates to Short Message Service (SMS) in telecommunication systems. More specifically, the invention relates to a method of identifying false Short Message Service (SMS) delivery reports.

Enterprises often use a messaging platform to push bulk SMS messages to their customers, such as to the handset of a telecommunications subscriber. Following the transmission of an SMS message to a customer, the messaging platform provides the enterprise with an SMS delivery report, which indicates whether the delivery of the SMS message was successful or whether it failed. The enterprises using the messaging platform rely on the SMS delivery reports to understand the status of the delivery of their SMS messages. Depending on the type and content of the SMS message, accurate message delivery reporting is of great importance. For example, an SMS message notifying a customer of false credit card transactions would be of great importance in detecting fraud. Thus, it is paramount that enterprises that use messaging platforms must be provided with accurate and genuine SMS delivery reports. Furthermore, services that rely on the reported status of delivered/undelivered SMS messages cannot function properly when the SMS delivery reports convey inaccurate or false information.

The incidents of aggregators and operators generating false successful delivery reports are not uncommon. The false successful delivery reports misrepresent the delivery information by indicating that a message was delivered to the recipient, when, in fact, the message was not delivered. Currently known methods of detecting false SMS delivery reports are unreliable and inefficient. Because false SMS delivery reports typically mimic the structure of genuine SMS delivery reports, it may difficult to discern genuine reports from the ones that are false.

One of the techniques for identifying false delivery reports involves measuring a conversion rate based on the SMS recipient's action responsive to receipt of the SMS text message, for example by clicking a button on a website, entering text, etc. A major flaw of this method is that it is only applicable to use cases wherein the SMS text message instructs a recipient to physically respond to the SMS message. Another technique involves using probes, wherein SMS text messages are sent to known valid and/or invalid test phone numbers and detecting a false SMS delivery report when unanticipated results are observed. This method, however, does not enable the enterprises to identify in-and-around messages delivered through back door SMS routes that are not sanctioned by the mobile phone operators. Also, there is a need to quickly identify occurrences of false SMS delivery reports whenever aggregators engage in such practice.

Accordingly, what is needed in the art is an improved system and method for identifying false SMS delivery reports that overcomes the prior art deficiencies.

SUMMARY OF THE INVENTION

The long-standing but heretofore unfulfilled need for a method of identifying false SMS delivery reports is now met by a new, useful, and nonobvious invention.

In one embodiment, the present invention provides a method of detecting false Short Messaging System (SMS) delivery reports, which includes, defining one or more attributes representative of a genuine SMS delivery report and creating a statistical model for a genuine SMS delivery report based upon the one or more attributes. The method further includes, receiving a subsequent SMS delivery report, analyzing the subsequent SMS delivery report using the statistical model to detect one or more anomalies in the subsequent SMS delivery report and determining that the subsequent SMS delivery report is a false SMS delivery report if one or more anomalies are detected. The one or more anomalies may be detected in the subsequent SMS delivery report if the subsequent delivery report deviates from the statistical model by more than a predetermined threshold.

The method may further include, flagging the SMS delivery report as a false SMS delivery report and delivering the flagged false SMS delivery report to the originating network operator.

In an exemplary embodiment, the one or more attributes may define one or more rules based upon the one or more data fields of the genuine SMS delivery report. Additionally, the method may include sending SMS messages to known valid and invalid subscriber numbers to further calibrate the statistical model for detection of the false SMS delivery reports.

In an additional embodiment, the present invention provides a computer program product comprising computer executable instructions embodied in a non-transitory computer-readable medium for performing steps to detect false Short Messaging System (SMS) delivery reports. The steps may include, defining one or more attributes representative of a genuine SMS delivery report, creating a statistical model for a genuine SMS delivery report based upon the one or more attributes, receiving a subsequent SMS delivery report, analyzing the subsequent SMS delivery report using the statistical model to detect one or more anomalies in the subsequent SMS delivery report and determining that the subsequent SMS delivery report is a false SMS delivery report if one or more anomalies are detected.

In another embodiment, a system for detecting false Short Messaging System (SMS) delivery reports is provided which includes an SMS router for receiving a plurality of SMS messages from a network operator partner, for delivering the plurality of SMS messages to a destination network, wherein the plurality of SMS messages are destined for a subscriber of the destination network. The system further includes, an anomaly detection processor for defining one or more attributes representative of a genuine SMS delivery report, for creating a statistical model for a genuine SMS delivery report based upon the one or more attributes, for receiving a subsequent SMS delivery report, for analyzing the subsequent SMS delivery report using the statistical model to detect one or more anomalies in the subsequent SMS delivery report and for determining that the subsequent SMS delivery report is a false SMS delivery report if one or more anomalies are detected.

In the present invention, the method of detecting false SMS delivery reports involves the application of machine learning. An anomaly detection algorithm is used to detect, and flag false successful delivery reports returned by aggregators and operators. Using this algorithm in conjunction with probes (sending text messages to invalid phone numbers) improves detection of false successful delivery reports.

The machine learning algorithm of the present invention is configured for anomaly detection to recognize unusual patterns in the SMS delivery reports and flags the delivery reports as false.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention provides a system and method for identifying false Short Message Service (SMS) delivery reports.

Figure 1:
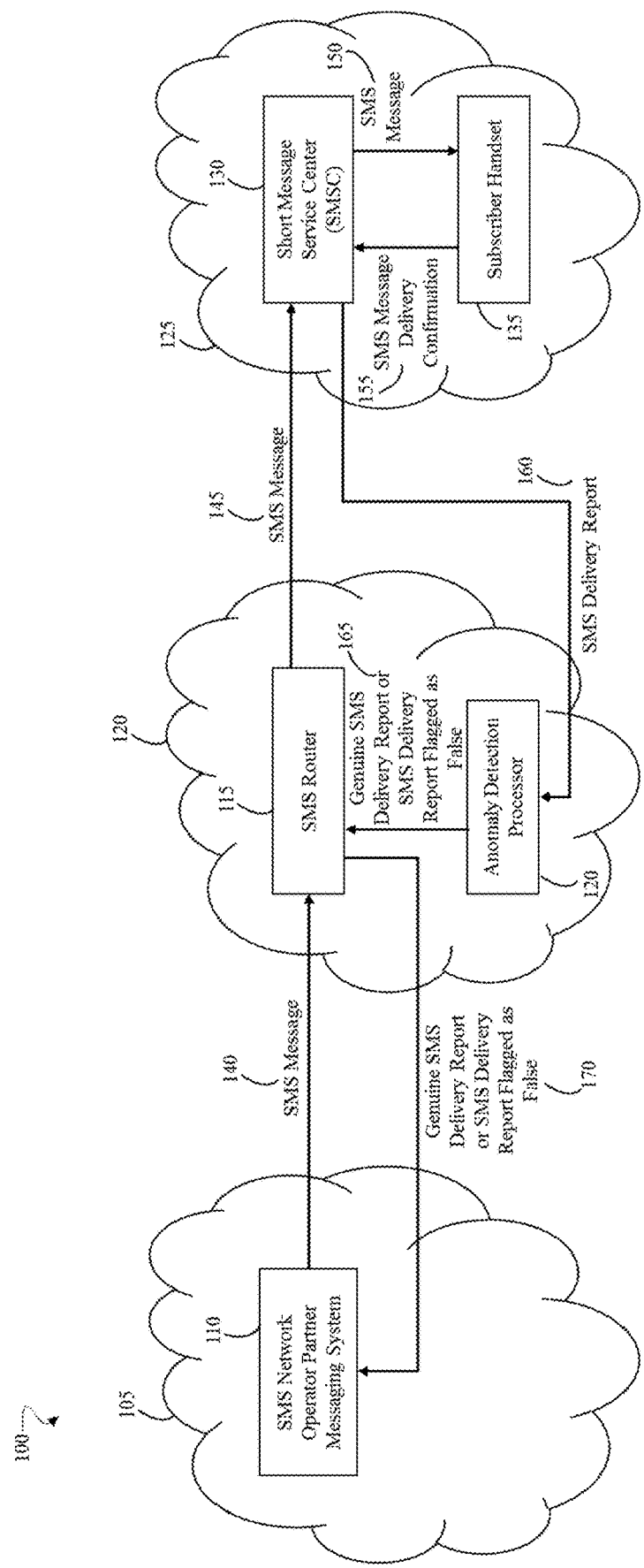
FIG. 1 is a diagram illustrating a system for identifying false SMS delivery reports, in accordance with an embodiment of the present invention.

With reference to FIG. 1, a system 100 for delivering SMS messages using a Short Message Peer-to-Peer (SMPP) protocol between an originating network 105 and a destination network 125 may include an SMS Gateway 122 that assists in the delivery of the SMS messages between the originating network 105 and the destination network 125.

The originating network 105 may include an SMS Network Operator Partner Messaging System 110 and the destination network 125 may include a Short Message Service Center (SMSC) 130. Various subscriber handsets 135 in the destination network 125 may be in communication with the SMSC 130 to receive SMS messages 150 from the SMSC 130 and to return SMS message delivery confirmations 155 from the subscriber handset 135 to the SMSC 130.

In the present invention, the SMS Gateway 122 includes an SMS router 115 in communication with an anomaly detection processor 120. In operation, the SMS router 115 receives one or more SMS messages 140 and routes the SMS messages 145 to the designated subscriber handset 135 in the destination network 125 using the SMSC 130. The anomaly detection processor 120 receives the SMS delivery reports 160 from the SMSC 130 and analyzes the SMS delivery reports 160 to distinguish false SMS delivery reports from genuine SMS delivery reports. The anomaly detection processor 120 communicates the results of the analysis to the SMS router 115 and the SMS router 115 then provides the genuine SMS delivery reports or the SMS delivery reports that have been identified by the anomaly detection processor 120 as being false delivery reports 170 to the SMS network operator partner messaging system 110 in the originating network 105.

As is known in the art, the SMS router 115 and the anomaly detection processor 120 may include a combination of hardware and software to perform the routing of SMS messages between the originating network 105 and the subscriber handset 135 in the destination network 125. The SMS router 115 may include a transceiver for sending and receiving the SMS messages and a routing table for identifying the subscriber handset 135 where the message is to be delivered. The anomaly detection processor 120 may include memory and various processing circuitry for identifying false SMS delivery reports, as will be described in more detail below.

The content of an SMS delivery report sent using Short Message Peer-to-Peer (SMPP) protocol may include certain data fields, such as error code, submit and done times, and a few words taken from the SMS text message itself. SMS delivery reports are sent in response to an attempt to deliver an SMS message to a subscriber handset 135 on a destination network 125.

False successful SMS delivery reports typically have fixed, predefined values that may differ from the actual values that would be conveyed in a genuine successful SMS delivery report. Additionally, false successful delivery reports may also exhibit anomalies in the arrival patterns of the SMS messages. For example, any SMS delivery report that arrives after an unusually long time, subsequent to the SMS message submission, or that arrives at a predictable frequency, is a suspected false SMS delivery report.

In various embodiments, the present invention provides a method for detecting false Short Messaging System (SMS) delivery reports, which includes, defining one or more attributes representative of a genuine SMS delivery report and creating a statistical model for a genuine SMS delivery report based upon the one or more attributes. The anomaly detection processor 120 is used in the creation of the statistical model and after the statistical model has been create, the anomaly detection processor 120 receives subsequent SMS delivery reports, analyzes the subsequent SMS delivery report using the statistical model to detect one or more anomalies in the subsequent SMS delivery report and may then determine whether the subsequent SMS delivery report is a false SMS delivery report if one or more anomalies are detected. The SMS router 115 may then notify the SMS network operator partner messaging system 110 that a false SMS delivery report has been detected.

In one embodiment, the method of the present invention applies an anomaly detection algorithm that builds a probability density function (PDF) to model genuine successful SMS delivery models based on arrival patterns and the data present in the data fields of a SMS delivery report. This model is then applied to a subsequent delivery report to detect whether that delivery report is an anomaly. If a delivery report is flagged as an anomaly, the delivery report is flagged and reported. Prior to applying the anomaly detection algorithm, the method may transform values of data fields of the SMS delivery reports into 'attributes' after applying normalization. Thus, an attribute vector is constructed and then used in the anomaly detection algorithm.

An exemplary delivery report will generally have the following format:

| Delivery Report Data Fields | Description |
| --- | --- |
| id: IIIIIIIII | Carrier Level Message Identifier |
| sub: SSS | Carrier Level Sub-ID of the Message |
| dlvrd: DDD | Delivery Status |
| submit date: YYMMDDhhmm | Date and Timestamp when the Message was Submitted |
| done date: YYMMDDhhmm | Date and Timestamp when the Delivery Status was Changed to Delivered |
| stat: DDDDDDD | Current Status of the Message |
| err: E | Error code |
| Text: . . . | One or more Characters of the Message Text |

As such, in various embodiments, an SMS delivery report may include one or more of the data fields, including but not limited to, a carrier level message identifier, a carrier level sub-ID, a message delivery status, a message submission date and time, a date and timestamp when the message was submitted, a date and timestamp when the message delivery status changed, a current status of the message, an error code and one or more characters of the message text. The SMS delivery report data fields shown in the table above are not intended to be limiting, and various other SMS delivery report data fields are within the scope of the present invention.

In an exemplary embodiment, timestamps for the SMS message submission date and time and for the SMS delivery report arrival date and time are captured by the SMSC messaging service 130. The SMS delivery report may also communicate the validity of a phone number that the message is sent to.

A genuine SMS delivery report typically obeys the following rules:
1. Submit_date>Message submission date
2. Done date>Submit date
3. Delivery receipt date>Submit date
4. Tracking identifier of Delivery report matches with submit_sm response
5. Valid status and error code and aligns with expected delivery status
6. Text matches message content
7. Valid submit_date and done_date
8. Differences between timestamps follow Gaussian distribution A false SMS delivery report will likely violate one or more of the rules listed above. When an SMS delivery report received at the anomaly detection processor 120 violates one or more of the rules of a genuine SMS delivery report, an anomaly has been detected in the SMS delivery report and the SMS delivery report is flagged as a false SMS delivery report.

Figure 2:
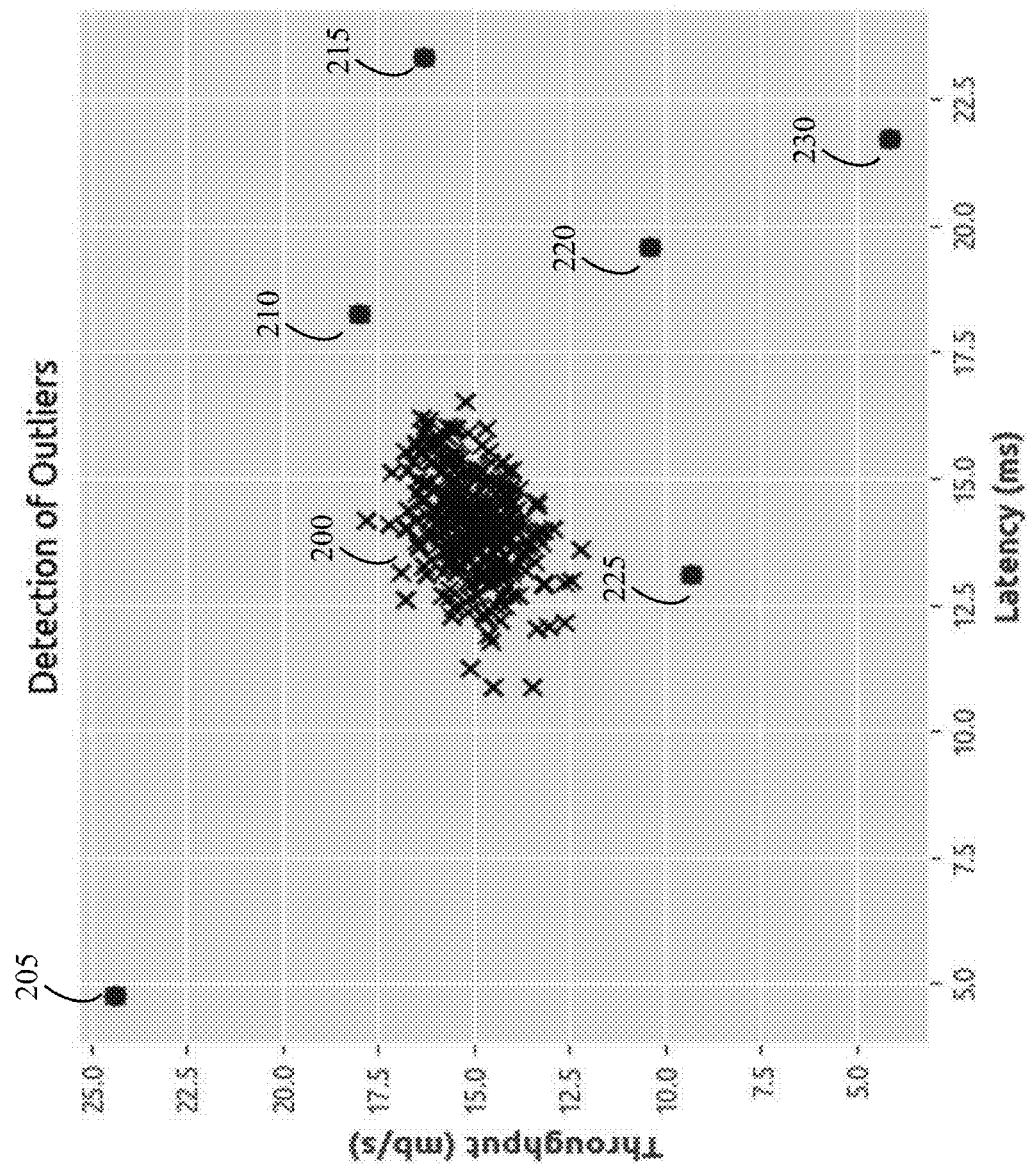
FIG. 2 is a graph illustrating exemplary attributes that can be used for the detection of false SMS delivery reports based on latency and throughput, in accordance with an embodiment of the present invention.

FIG. 2 depicts a map of SMS delivery reports relative to latency and throughput. In the graphical map, data from the SMS delivery reports and message delivery are mapped to attributes. FIG. 2 illustrates that most delivery reports provide information that follows a pattern 200 and that there are some clear outliers 205, 210, 215, 220, 225, 230. In the present invention, these outliers are flagged as by the anomaly detection processor 120 as anomalies.

The graph depicted in FIG. 2 enables visualization of attributes of SMS delivery reports, for example, delivery report arrival and message submission time. Delivery reports having attributes that are fixed or significantly high appear as outliers in the graph. In general, attributes from false delivery reports will appear as outliers in the visual graph, wherein the data values of false delivery reports appear far away from the cluster of genuine delivery reports 200 in a graphical illustration.

In a particular embodiment, the statistical model used to identify anomalies in the SMS delivery reports may be implemented through machine learning procedure. As such, a machine learning algorithm may be trained using patterns of attributes of genuine SMS delivery reports, which then enables the anomaly detection algorithm to detect outliers in subsequent SMS delivery reports. In the machine learning model, anomaly detection involves both a training phase and a prediction phase. Machine learning techniques involving both a training phase and a prediction phase are known in the art and various techniques for implementing a machine learning model are within the scope of the present invention.

Figure 3A:
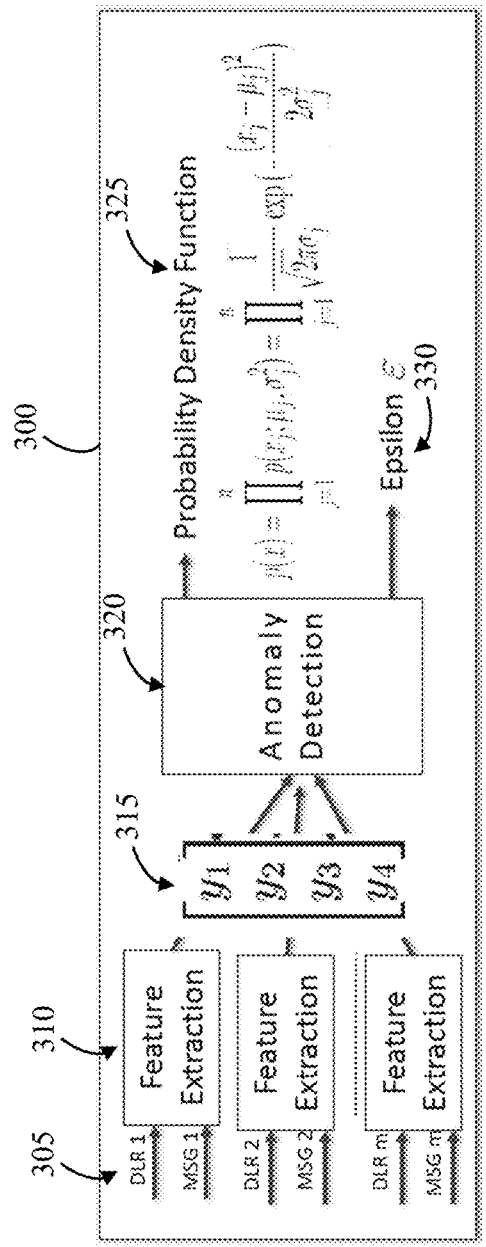
FIG. 3A is a diagram illustrating the training phase of the anomaly detection algorithm, in accordance with an embodiment of the present invention.

Regarding the training phase of the machine learning procedure, FIG. 3A schematically depicts an exemplary method of training an anomaly detection algorithm 300. In the present invention, the anomaly detection algorithm is implemented in the anomaly detection processor 120 of the SMS gateway 122. In this embodiment, various attributes 315 of a plurality of SMS delivery reports 305 that are selected and extracted 310 for use in the anomaly detection algorithm that effect the performance of the algorithm 300. The attributes 315 that show variance in values/content between genuine SMS delivery reports and false SMS delivery reports are selected and anomaly detection 320 is implemented to train the machine learning algorithm and provide a probability density function (PDF) 325 and Anomaly detection works for features that are both Gaussian distributed and non-Gaussian distributed. If the selected attributes 315 are inter-related, anomaly detection has another probability density function (PDF) function, which is a multi-variate Gaussian distribution.

Figure 3B:
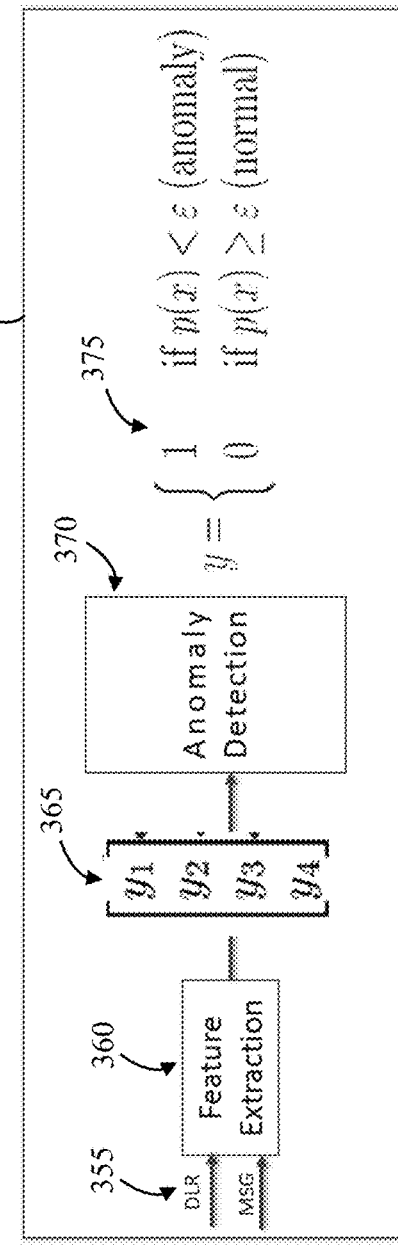
FIG. 3B is a diagram illustrating the prediction phase of the anomaly detection algorithm for identifying SMS delivery reports that are flagged as anomalies, in accordance with an embodiment of the present invention.

Regarding the prediction phase of the machine learning procedure, FIG. 3B depicts an exemplary method for the prediction phase for detecting anomalies 350 in a subsequently received SMS delivery that signify that the delivery report is likely false. The anomaly detection 370 performed in the prediction phase computes p(x) 375 for every new delivery report 355, wherein the attributes 365 are extracted 360 from the SMS delivery report 355. In this embodiment, if p(x)<ε, then the delivery report is flagged as an anomaly. The method can perform further checks and/or backup actions, such as message delivery through the same or different transmission channels. The method can also assess the quality of aggregators and network operators.

In one embodiment, anomaly detection algorithm involves the following steps:
1. Selecting features $x_i$ that are deemed to be likely indicative of anomalous examples.
2. Fitting parameters $\mu_1, \ldots, \mu_n, \sigma_1^2, \ldots, \sigma_n^2$ a using the following equations:

$$\mu_j = \frac{1}{m}\sum_{i=1}^{m} x_j^{(i)})$$

$$\sigma_j^2 = \frac{1}{m}\sum_{i=1}^{m} (x_j^{(i)} - \mu_j)^2$$

3. Given new example x, compute p(x):

$$p(x) = \prod_{j=1}^{n} p(x_j, \mu_j, \sigma_j^2) = \prod_{j=1}^{n} \frac{1}{\sqrt{2\pi}\,\sigma_j} \exp\left(-\frac{(x_j - \mu_j)^2}{2\sigma_j^2}\right)$$

A SMS delivery report is flagged as an anomaly if $p(x)<\varepsilon$.

To refine the anomaly detection in the machine learning process, in another embodiment, the method further may further include sending test SMS messages to phone numbers that are known to be invalid. If the SMS delivery report that is received responsive to the test SMS message indicates a successful delivery, then the SMS delivery report is classified as false. This false SMS delivery report resulting from the test SMS message may then be used to improve the machine learning process by analyzing the content of the false SMS delivery report and using statistical techniques to compare subsequent delivery reports against the false delivery report. If a subsequent delivery report has certain similar attributes as the false report, then the subsequent delivery report is flagged as a potentially false report.

Additionally, the method may include sending test messages to a subscriber phone number that is known to be valid. The successful delivery report received in response to the test message may then be used for calibration of the machine learning model. Test messages to both valid and invalid numbers may be injected during the days when peak volumes are expected, especially during large text messaging campaigns.

In general, the present invention may perform a probing technique by sending SMS messages to both known valid and invalid subscriber numbers to calibrate the statistical model used in the machine learning training phase of the invention. When the method uses a probing technique to send test messages to valid and invalid phone numbers, with a defined pattern, the anomaly detection is able to record this pattern as an anomaly, and then use statistical 'similarity' functions to detect similar false successful SMS delivery reports.

Figure 4:
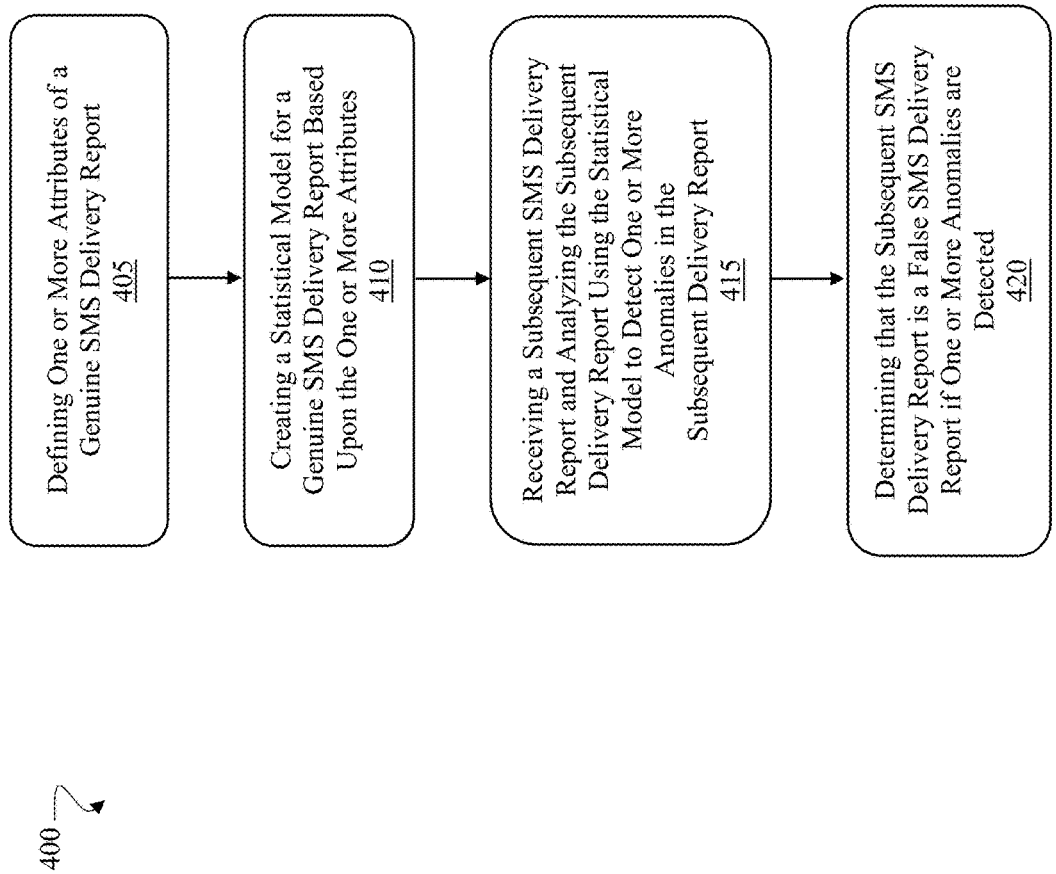
FIG. 4 is a flow diagram illustrating a method for detecting false SMS delivery reports, in accordance with an embodiment of the present invention.

A method for detecting false SMS delivery reports 400 is illustrated with reference to FIG. 4. In a first step 405, the method includes defining one or more attributes of a genuine SMS delivery report. The anomaly detection processor 120 of FIG. 1 may be used to define the one or more attributes, or alternatively, the attributes may be defined external to the anomaly detection processor 120 and the attributes may be stored in a memory of the anomaly detection processor 120.

In a next step 410, the method includes creating a statistical model for a genuine SMS delivery report based upon the one or more attributes. The anomaly detection processor 120 of FIG. 1 may be used to create the statistical model for a genuine SMS delivery report based upon the one or more attributes.

In the following step 415, the method includes receiving a subsequent SMS delivery report and analyzing the subsequent delivery report using the statistical model to detect one or more anomalies in the subsequent delivery report. The anomaly detection processor 120 of FIG. 1 may be used to detect on or more anomalies in the subsequent delivery report.

In a final step 420, the method includes determining that the subsequent SMS delivery report is a false SMS delivery report if one or more anomalies are detected. The anomaly detection processor 120 of FIG. 1 may be used to determine that the subsequent SMS delivery report is a false if one or more anomalies are detected in the subsequent delivery report.

Accordingly, in various embodiments, the present invention provides an improved system and method for identifying false SMS delivery reports that overcomes the prior art deficiencies.

Hardware and Software Infrastructure Examples

The present invention may be embodied on various computing platforms that perform actions responsive to software-based instructions and most particularly for low-vision user software. These include both traditional desktop and notebooks devices and also smartphones and tablets. Furthermore, the computing device may reside within the braille display, thus making the braille display a standalone reader for electronic documents. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to certain statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic, Objective C, Python or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

What is claimed is:

1. A method of detecting false Short Messaging System (SMS) delivery reports, the method comprising:
   defining one or more attributes representative of a genuine SMS delivery report;
   creating a statistical model for a genuine SMS delivery report based upon the one or more attributes;
   receiving a subsequent SMS delivery report;
   analyzing the subsequent SMS delivery report using the statistical model to detect one or more anomalies in the subsequent SMS delivery report; and
   determining that the subsequent SMS delivery report is a false SMS delivery report when one or more anomalies are detected.

2. The method of claim 1, wherein the subsequent SMS delivery report is received in response to an SMS message sent from an originating network operator, the method further comprising: if it is determined that the subsequent SMS delivery report is a false SMS delivery report; flagging the SMS delivery report as a false SMS delivery report; and delivering the flagged false SMS delivery report to the originating network operator.

3. The method of claim 1, wherein the genuine SMS delivery report comprises one or more data fields, and wherein the one or more attributes are defined based upon the one or more data fields of the genuine SMS delivery report.

4. The method of claim 3, wherein the one or more data fields are selected from a carrier level message identifier, a carrier level sub-ID, a message delivery status, a message submission date and time, a date and timestamp when the message was submitted, a date and timestamp when the message delivery status changed, a current status of the message, an error code and one or more characters of the message text.

5. The method of claim 3, wherein the one or more attributes defines one or more rules based upon the one or more data fields of the genuine SMS delivery report.

6. The method of claim 1, wherein defining one or more attributes representative of a known genuine SMS delivery report, further comprises receiving a plurality of genuine SMS delivery reports and defining the one or more attributes based upon the plurality of known genuine SMS delivery reports.

7. The method of claim 1, wherein one or more anomalies are detected in the subsequent SMS delivery report if the subsequent SMS delivery report deviates from the statistical model by more than a predetermined threshold.

8. The method of claim 1, further comprising: sending an SMS messages to a known valid subscriber number; receiving a genuine SMS delivery report in response to the SMS message; and using the genuine SMS to calibrate the statistical model.

9. The method of claim 1, further comprising:
   sending an SMS message to known invalid subscriber number;
   receiving an SMS delivery report indicating that the SMS message was delivered; and
   responsive to receiving the SMS delivery report, classifying the SMS delivery report as a false SMS delivery report and using the false SMS report to calibrate the statistical model.

10. A computer program product comprising computer executable instructions embodied in a non-transitory computer-readable medium for performing steps to detect false Short Messaging System (SMS) delivery reports, the steps include:
    defining one or more attributes representative of a genuine SMS delivery report;
    creating a statistical model for a genuine SMS delivery report based upon the one or more attributes;
    receiving a subsequent SMS delivery report;
    analyzing the subsequent SMS delivery report using the statistical model to detect one or more anomalies in the subsequent SMS delivery report;
    and determining that the subsequent SMS delivery report is a false SMS delivery report when one or more anomalies are detected.

11. The computer program product of claim 10, wherein the subsequent SMS delivery report is received in response to an SMS message sent from an originating network operator, the steps further comprising:
    if it is determined that the subsequent SMS delivery report is a false SMS delivery report;
    flagging the SMS delivery report as a false SMS delivery report; and
    delivering the flagged false SMS delivery report to the originating network operator.

12. The computer program product of claim 10, wherein the genuine SMS delivery report comprises one or more data fields, and wherein the one or more attributes are defined based upon the one or more data fields of the genuine SMS delivery report.

13. The computer program product of claim 10, the steps further comprising:
    sending an SMS messages to a known valid subscriber number;
    receiving a genuine SMS delivery report in response to the SMS message; and
    using the genuine SMS to calibrate the statistical model.

14. The computer program product of claim 10, the steps further comprising:
    sending an SMS message to known invalid subscriber number;

receiving an SMS delivery report indicating that the SMS message was delivered; and responsive to receiving the SMS delivery report, classifying the SMS delivery report as a false SMS delivery report and using the false SMS report to calibrate the statistical model.

15. A system for detecting false Short Messaging System (SMS) delivery reports, the system comprising:

an SMS router for receiving a plurality of SMS messages from a network operator partner, for delivering the plurality of SMS messages to a destination network, wherein the plurality of SMS messages are destined for a subscriber of the destination network; and an anomaly detection processor for defining one or more attributes representative of a genuine SMS delivery report, for creating a statistical model for a genuine SMS delivery report based upon the one or more attributes, for receiving a subsequent SMS delivery report, for analyzing the subsequent SMS delivery report using the statistical model to detect one or more anomalies in the subsequent SMS delivery report and for determining that the subsequent SMS delivery report is a false SMS delivery report when one or more anomalies are detected.

16. The system of claim 15, wherein the subsequent SMS delivery report is received in response to an SMS message sent from an originating network operator, and if it is determined that the subsequent SMS delivery report is a false SMS delivery report, the anomaly detection processor further for flagging the SMS delivery report as a false SMS delivery report and for delivering the flagged false SMS delivery report to the originating network operator.

17. The system of claim 15, wherein the genuine SMS delivery report comprises one or more data fields, and wherein the one or more attributes are defined based upon the one or more data fields of the genuine SMS delivery report.

18. The system of claim 17, wherein the one or more data fields are selected from a carrier level message identifier, a carrier level sub-ID, a message delivery status, a message submission date and time, a date and timestamp when the message was submitted, a date and timestamp when the message delivery status changed, a current status of the message, an error code and one or more characters of the message text.

19. The system of claim 15, wherein the anomaly detection processor is further for sending an SMS messages to a known valid subscriber number, for receiving a genuine SMS delivery report in response to the SMS message and for using the genuine SMS to calibrate the statistical model.

20. The system of claim 15, wherein the anomaly detection processor is further for sending an SMS message to known invalid subscriber number, for receiving an SMS delivery report indicating that the SMS message was delivered and for, responsive to receiving the SMS delivery report, classifying the SMS delivery report as a false SMS delivery report and using the false SMS report to calibrate the statistical model.

* * * * *